March 1, 1966

H. BREDEMEIER  3,237,782

SWING LOADING GEAR, PARTICULARLY FOR USE ON SHIPS

Filed Jan. 20, 1964

INVENTOR
HORST BREDEMEIER

By Ezekiel Wolf, Wolf & Greenfield
Attorney

United States Patent Office 3,237,782
Patented Mar. 1, 1966

3,237,782
SWING LOADING GEAR, PARTICULARLY FOR USE ON SHIPS
Horst Bredemeier, Bremen, Germany, assignor to Atlas-Werke AG., Bremen, Germany, a corporation of Germany
Filed Jan. 20, 1964, Ser. No. 338,894
Claims priority, application Germany, Jan. 23, 1963, A 42,153
3 Claims. (Cl. 212—66)

This invention relates to loading gear, particularly for use on ships, of the kind having a derrick or boom pivotally mounted at its foot on a rotatable support member which is provided with an arm acted on by a piston drive. In known loading gears of this kind the piston drive acts directly on the arm which is rigidly connected to the support member. By virtue of such arrangement a maximum angular movement of approximately 150° can be achieved. It is true that with a rotating wing drive an angular range of more than 150° can be obtained. A conventional rotating wing drive is a hydraulic drive in which two or more radial wings are fixed on a rotating shaft and are situated in two or more chambers of a cylindrical casing arranged concentrically with the shaft and provided with two or more radial walls which extend up to the surface of the shaft for dividing the space between the cylindrical casing and the shaft into two or more chambers. A drive of this type is unsuitable for loading gear, such as cranes, on board ships. The reason for this is the incomplete sealing of the wings. In the case of a crane mounted on a ship, it may occur, because of the heeling or rolling of the ship, that the crane with the load suspended from it will have to take a turning moment in the position of rest. When a rotating wing is used as crane drive, a loading turning moment of this type would have the consequence that the derrick or boom with its suspended load would, in consequence of leakages, move uncontrollably, although slowly. In the case of a rotating wing drive this disadvantage can be obviated only by providing an oil leakage compensating system. This in turn has the disadvantage of being very expensive and complicated, while necessarily requiring skilled personnel, in order to be always ready for operation.

The present invention aims at obviating the foregoing disadvantages and to this end consists in a loading gear, particularly for use on ships, comprising a derrick or boom pivotally mounted at its foot on a rotatable support member, an arm rigidly connected to said support member and extending radially therefrom, a lever pivotally mounted at one end about an axle which extends parallel to the axis of said support member and which is arranged in offset relationship thereto, and at least one piston drive for angularly displacing the lever about said axle, the arrangement being such that the lever is operatively connected to said arm by means of a sliding link arrangement whereby for a predetermined angular displacement of the lever about said axle, the arm together with the derrick or boom effects an angular displacement which is approximately twice that of said lever. A piston drive thus arranged permits a substantially greater turning movement than known piston drives, namely up to 200°. At the same time it is merely necessary to use one of the known circular piston seals in order to obtain readiness for operation at all times with minimum servicing and also minimum cost. These requirements are particularly of importance to cranes for ships.

In order that the invention may be more readily understood, reference is made to the accompanying drawings which illustrate diagrammatically and by way of example, one embodiment thereof, and in which.

Figure 1:
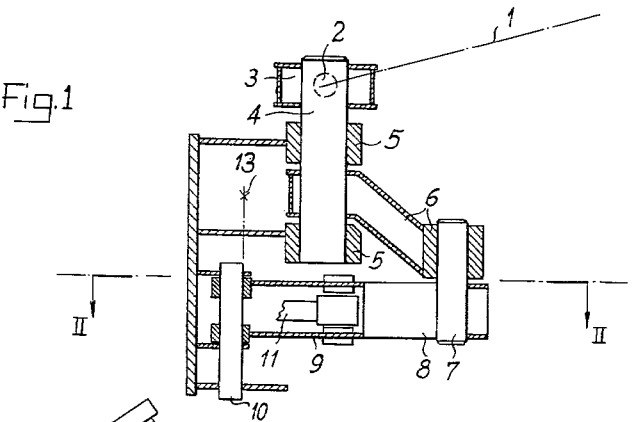
FIGURE 1 shows a loading gear in a section on the line I—I of FIGURE 2.
Figure 2:
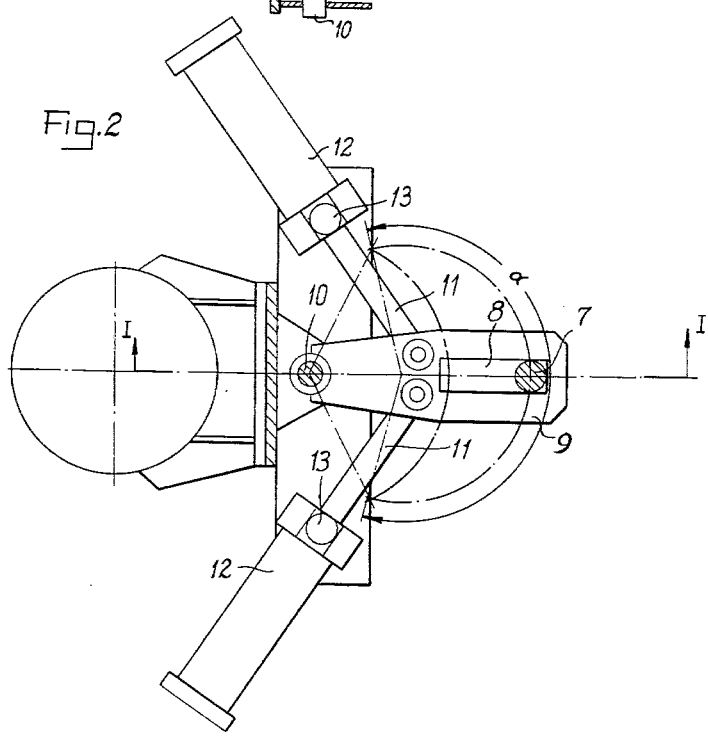
FIGURE 2 shows a section on the line II—II of FIGURE 1.

In the embodiment illustrated the derrick or boom 1 (indicated only by its center line) is pivotally connected at its forked foot by means of pins 2 to a transverse bearer 3 on the top end of a rotatable support column 4. The derrick 1 is tilted or rocked about the axis of the pins 2 in the usual manner by a pendant or hydraulic drive.

The support column 4 rests in bearings 5, 5' and is rigidly connected to a downwardly cranked arm 6 which carries a downwardly directed pin 7 engaging an elongated slot 8 of a lever arm 9. The pin 7 and the slot 8 form a sliding link arrangement. The slot 8 is disposed radially in the lever arm 9 which is rotatable about an axle 10 extending parallel to but offset in relation to the axis of the support column 4. The lever arm 9 is acted on by the piston rods 11 of two piston drives having cylinders 12 rotatable about vertical axes 13.

The mutual offsetting of the axis of the support column 4 and from the axis 10, and also the lengths of the arm and lever are so dimensioned that with an angular movement of the lever 9 through approximately 100° an angular movement of the arm 6 and hence of the derrick 1 through about 200° is obtained.

The present invention is not limited to the embodiment illustrated and described, many modifications of construction being possible. In particular, the arm and lever arranged between the support column 4 and piston drive 11, 12, together with the elongated slot, may be of different construction from that shown in the example illustrated. Moreover, the sliding link arrangement is generally provided with a sliding block in which the pin of the arm 6 engages.

A single piston drive may be used, although for better balancing of the gear a two piston drive is preferred.

I claim:

1. A loading gear, particularly for use on ships, comprising a derrick or boom pivotally mounted at its foot on a rotatable support member, an arm rigidly connected to said support member and extending radially therefrom, a lever pivotally mounted at one end about an axle which extends parallel to the axis of said support member and which is arranged in offset relationship thereto, and at least one piston drive for angularly displacing the lever about said axle, the arrangement being such that the lever is operatively connected to said arm by means of a sliding link arrangement whereby for a predetermined angular displacement of the lever about said axle, the arm together with the derrick or boom effects an angular displacement which is approximately twice that of said lever.

2. A loading gear as claimed in claim 1, wherein the sliding link arrangement is constituted by a slot formed in said lever and a pin carried by said arm and engaging said slot.

3. A loading gear as claimed in claim 1, wherein two piston drives are provided for the lever, one at each side of said lever.

References Cited by the Examiner
UNITED STATES PATENTS
3,042,236   7/1962   Pilch _____ 214—151
3,047,171   7/1962   Long _____ 214—138

HUGO O. SCHULZ, Primary Examiner.